Aug. 21, 1928.

W. JORDAN

OVEN FOR COOKING STOVES

Filed Sept. 2, 1927

Inventor

William Jordan

By Clarence A O'Brien
Attorney

Aug. 21, 1928.                                             1,681,668
W. JORDAN
OVEN FOR COOKING STOVES
Filed Sept. 2, 1927        2 Sheets-Sheet 2
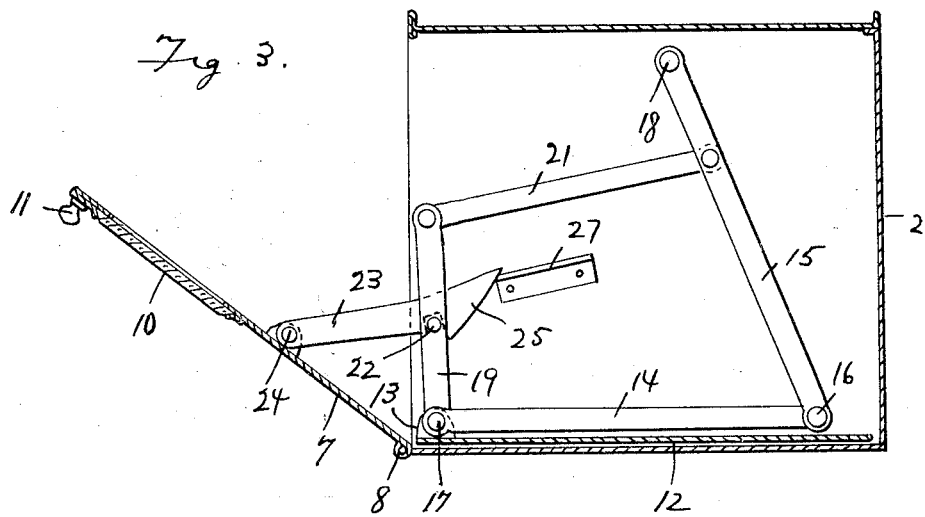
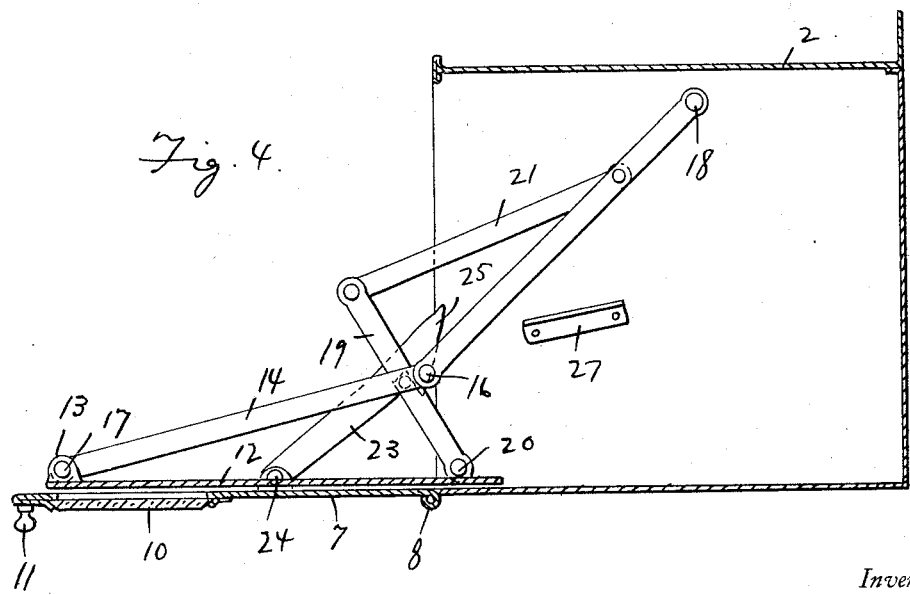
Inventor
William Jordan
By Clarence A. O'Brien
Attorney Patented Aug. 21, 1928.

1,681,668

UNITED STATES PATENT OFFICE.

WILLIAM JORDAN, OF LANCASTER, NEBRASKA.

OVEN FOR COOKING STOVES.

Application filed September 2, 1927. Serial No. 217,156.

The present invention relates to improvements in ovens for cooking stoves, and has for its principal object to provide a plate forming a false bottom for the oven, said oven being provided with a vertically swinging door which is hingedly secured to the lower edge of the open side of the oven, there being an operative connection between the door and the plate whereby said plate will slide outwardly of the oven simultaneously with the downward swinging movement of the door to an open position to permit dishes to be readily removed from the plate without any danger of the person being burned, the plate being adapted to slide inwardly into the oven simultaneously with the closing of the door.

Another important object of the invention is to provide an oven of the above mentioned character wherein means is provided for disconnecting the vertically swinging door from operative engagement with the sliding false bottom when the plate is entirely within the oven in order that the door may be fully closed.

A still further object is to provide an oven of the above mentioned character which is simple in construction, inexpensive, strong and durable and further well adapted to the purposes for which it is designed.

Other objects and advantages will become apparent during the course of the following description taken in connection with the accompanying drawings.

In the accompanying drawings forming a part of this application and in which like numerals indicate like parts throughout the same:

Figure 3 is a similar section showing the door in the act of being swung downwardly to an open position and the manner in which the notched lever cooperates with the laterally projecting stud or pin carried by the vertical arm which is operatively connected to the sliding plate, and Figure 4 is a vertical sectional view through the oven showing the position of the plate actuating means when the door is in a fully opened position and the plate is disposed outwardly of the oven.

Figure 1:
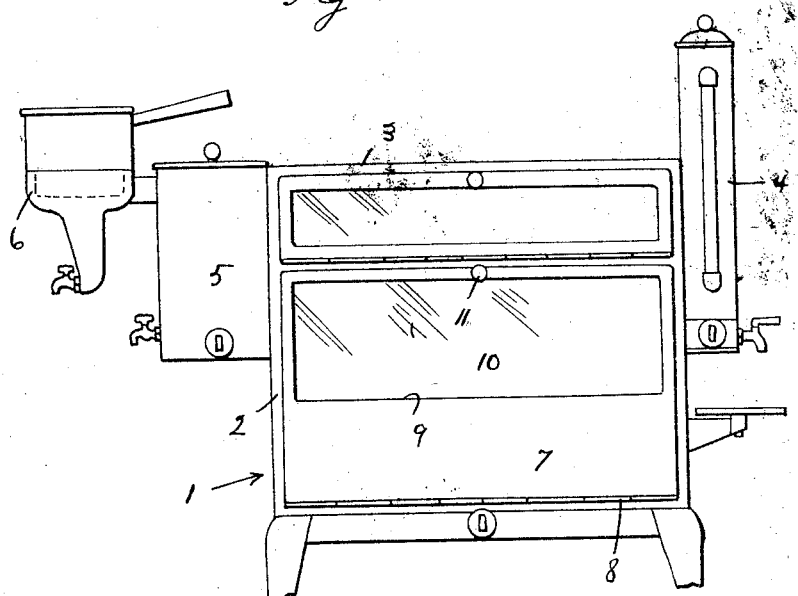
Figure 1 is a front elevation of an electric cooking stove with which my improved oven structure is associated.

In the drawings wherein for the purpose of illustration is shown the preferred embodiment of my invention, the numeral 1 designates generally an electric cooking stove, the same including a relatively large main oven 2 and a smaller oven 3, the latter being disposed above the main oven as clearly shown in Figure 1. The specific construction of the oven will hereinafter be more fully described.

A coffee urn designated generally by the numeral 4 is supported on one side of the stove, while a water heater 5 is supported on the other side. A steamer 6 is also supported on the stove adjacent the water heater 5. As each of the aforementioned units form no important part of the present invention, a detailed description thereof is thought unnecessary.

The main oven 2 is substantially rectangular in design and the open front side thereof has a cover 7 provided therefor the latter being hingedly secured at its lower edge to the forward lower edge of the oven as at 8 whereby said cover is adapted for vertical swinging movement. The upper portion of the cover is provided with an enlarged cut out portion 9, and supported in this cut out portion is the glass 10 whereby the interior of the oven may at all times be viewed when the door 7 is in a fully closed position. Any appropriate fastening means may be provided for holding the door in a fully closed position and a suitable knob 11 is provided for facilitating the swinging of the door to an open position in order that access to the oven may be easily had.

Forming a salient part of the present invention is the substantially rectangular shaped plate 12 which is adapted for horizontal slidable movement within the oven 2 and this plate provides a false bottom for the oven and the dishes or other receptacles containing the food to be heated rest on this plate when placed in the oven.

An upstanding ear 13 is formed on each side of the slidable plate 12 adjacent the forward edge thereof and the purpose of these ears will be presently apparent. A pair of elongated links designated by the numerals 14 and 15 respectively are pivotally connected at their adjacent ends as at 16. The outer end of the link 14 is pivotally secured to the adjacent upstanding ear 13 as at 17, while the outer end of the complementary link 15 is pivotally secured to the adjacent side of the oven at a point directly below the top of the oven and slightly rearwardly of the center as at 18. It is of course to be understood that a pair of such links are disposed on opposite sides of the slidable plate 12.

The invention further comprehends the provision of a pair of vertically disposed arms 19 which are pivotally secured at their lower ends to the inner faces of the opposite sides of the oven 2 adjacent the open front side thereof as at 20.

These vertically disposed arms 19 are of a shorter length than the complementary links 14 and 15 as is readily obvious from the construction disclosed in the drawings, and the upper ends of these arms are operatively connected to the upper end portions of the adjacent link sections 15 by means of the strip 21. Each strip is pivotally secured at its respective ends to the upper end of the arm 19 and the adjacent link section 15 in any appropriate manner.

A pin or stud 22 extends laterally from the intermediate portion of each vertically disposed arm 19 in an outward direction, and the purpose of these pins will also be hereinafter more fully described.

Figure 2:
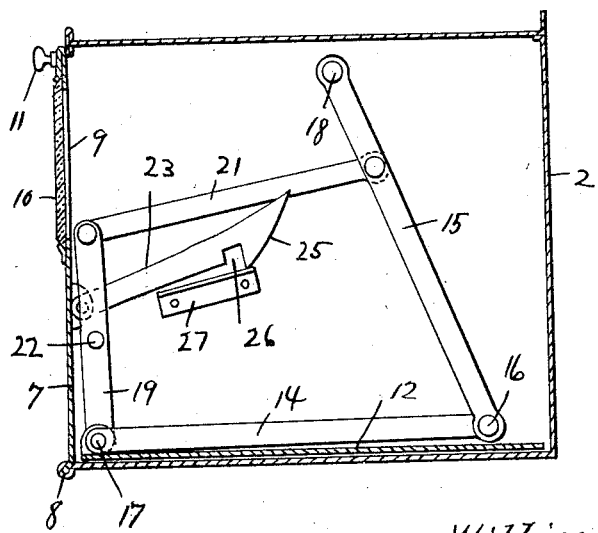
Figure 2 is a vertical sectional view through the oven showing the position of the plate actuating means when the plate is in the oven and the door is in a fully closed position.

A pair of levers such as are shown at 23 is pivotally secured at their forward ends to the inner face or side of the hinged door 7 as at 24, the levers being arranged adjacent the respective side edges of the door. The inner free end of each lever is enlarged and formed with a nose portion 25 and furthermore each lever is formed with a notch 26 in its lower edge adjacent the nose 25 as is shown more clearly in Figure 2. These notches are adapted to cooperate with the respective laterally projecting pins or studs 22, and as is clearly illustrated in the drawings, the levers are free to move between the vertically disposed arms 19 and the adjacent sides of the oven.

An angular trip member 27 is secured on the inner face of each side of the oven and is located in such a position as to be within the path of movement of the nose portion 25 of each lever as will also be presently described.

The operation of the several interconnected parts as above described will now be fully explained. When the door 7 is in a fully closed position, and the plate 12 is confined entirely within the oven 2 and is disposed adjacent the bottom of the oven the parts are disposed in the manner shown in Figure 2 and the nose portion 25 rests on the respective trip 27. When the door 7 reaches a predetermined position during its downward swinging movement to an open position, the notches 26 of the levers 23 will by gravity engage the respective laterally projecting pins or studs 22 thereby operatively connecting the cover or door 7 with the arms 19 and as these arms are operatively connected to the plate 12 by reason of the strips 21 and the complementary link sections 14 and 15, it will be obvious that a further swinging movement of the door in a downward direction will result in the outward sliding movement of the plate 12 so that when the door is in its lowermost position, the parts will assume the position shown in Figure 4 and the plate 12 will be substantially entirely out of the oven so that the dishes or other receptacles initially placed in the oven may be readily removed from the plate without any danger of a person being burned, such as frequently results in an attempt to remove hot dishes from the interior of an oven.

When the parts are arranged as shown in Figure 4, the receptacles containing the food to be cooked may be readily and easily placed on the plate 12. As the door 7 is swung upwardly, the plate 12 will move rearwardly into the oven maintaining the same horizontal position, and as soon as the nose 25 of each lever engages the respective trip 27, said levers will be raised upwardly to disengage the notches 26 from engagement with the respective pins 22, thus permitting the door to be moved to a fully closed position and to further permit the nose portions of the levers to ride over the trips.

It will thus be seen from the foregoing description that I have provided a novel oven structure for cooking stoves wherein the plate forming the false bottom will be adapted for simultaneous actuation with the hinged door during its vertical swinging movement either to a closed or open position.

The various links and levers as well as the other elements comprising the plate actuating means are so arranged within the oven as not to occupy any space which would cause improper placing of the containers for the food to rest on the plate.

Furthermore, the plate actuating means will at all times be positive and efficient in its operation.

While I have shown the preferred embodiment of my invention it is to be understood that various changes in the size, shape and arrangement of parts may be resorted to without departing from the spirit of the invention and the scope of the appended claims.

Having thus described the invention, what I claim as new is:—

1. In a cooking stove, an oven, the front side thereof being open, the door therefor hingedly secured to the lower edge of the oven, a plate adapted for horizontal slidable movement in the oven, a pair of pivotally connected links secured to the forward edge of the plate and each side of the oven respectively, a vertically disposed arm pivotally secured at its lower end to each side of the oven adjacent the open front side thereof, means for operatively connecting the upper end of each arm to one of the links of each pair which is connected to the side of the oven, and cooperating means between the door and said arms whereby the plate will move outwardly of the oven simultaneously with the downward swinging movement of the door to an open position, the plate being returned to its initial position within the oven simultaneously with the closing of the door, said last mentioned means comprising a pair of hooked shaped levers pivotally connected to the door, pins projecting laterally from the arms for cooperation with the hooked ends of the levers, and additional means for releasing the hooked levers from the pins to permit the return of the door to a fully closed position.

2. In a cooking stove, an oven, the front side thereof being open, the door thereof hingedly secured to the lower edge of the oven, a plate adapted for horizontal slidable movement in the oven, a pair of pivotally connected links secured to the forward edge of the plate and each slide of the oven respectively, a vertically disposed arm pivotally secured at its lower end to each side of the oven adjacent the open front side thereof, means for operatively connecting the upper end of each arm to one of the links of each pair which is connected to the side of the oven, and cooperating means between the door and said arms whereby the plate will move outwardly of the oven simultaneously with the downward swinging movement of the door to an open position, the plate being returned to its initial position within the oven simultaneously with the closing of the door, said last mentioned means comprising a pair of hooked shaped levers pivotally connected to the door, pins projecting laterally from the arms for cooperation with the hooked ends of the lever, additional means for releasing the hooked levers from the pins to permit the return of the door to a fully closed position, said last mentioned means comprising a trip secured on the inner face of each side of the oven disposed in a predetermined position, the hooked end of each lever being formed with a rounded nose for cooperation with the respective trip.

3. In a cooking stove, an oven, the front side thereof being open, the door thereof being hingedly secured to the lower edge of the oven, a plate adapted for horizontal sliding movement in the bottom of the oven, a pair of pivotally connected links secured to the forward edge of the plate and each side of the oven respectively, a vertically disposed arm pivotally secured at its lower end to each side of the oven adjacent the open front side thereof, said arm being of a length less than the length of either of said aforementioned links, a connection between the upper end of each arm and to the link of each pair that is connected to the side of the oven, cooperating means between the vertically swinging door and said arms whereby the plate will move outwardly of the oven simultaneously with the downward swinging movement of the door to an open position, the plate being returned to its initial position within the oven simultaneously with the closing of the door, said last mentioned means comprising a pair of hook shaped levers pivotally connected at their outer ends to the door, pins projecting laterally from the intermediate portions of the vertical arms for cooperation with the hooked inner ends of the levers, and additional means for releasing the hooked levers from the pins to permit the return of the door to a fully closed position, said means comprising a trip forming track secured on the inner face of each side of the oven in an inclined manner, the hooked inner end of each lever being formed with a rounded nose to engage with the respective trip forming track.

In testimony whereof I affix my signature.

WILLIAM JORDAN.